United States Patent [19]

Mamadzhanov et al.

[11] 4,400,266
[45] Aug. 23, 1983

[54] METHOD AND APPARATUS FOR SEPARATING SOLID PHASE FROM DRILLING MUD

[76] Inventors: Ulmas D. Mamadzhanov, Ts-1, dom 19, kv. 25; Vitold M. Bakhir, Gaidara, 7"a", kv. 17; Vladimir I. Klimenko, Chilanzar, kvartal 23, dom 3, kv. 37; Stanislav A. Alekhin, Chilanzar, kvartal 24, dom 53, kv. 89; Jury G. Zadorozhny, Chilanzar, kvartal 2, dom 59, kv. 12, all of, Tashkent, U.S.S.R.

[21] Appl. No.: 224,548

[22] PCT Filed: Mar. 26, 1980

[86] PCT No.: PCT/SU80/00054
§ 371 Date: Nov. 27, 1980
§ 102(e) Date: Nov. 25, 1980

[87] PCT Pub. No.: WO80/02047
PCT Pub. Date: Oct. 2, 1980

[51] Int. Cl.³ .......................... B03C 7/00; B03C 7/06
[52] U.S. Cl. .......................................... 209/130; 209/1
[58] Field of Search .................. 204/184, 304, 188; 210/748; 209/1, 128, 129, 130, 606; 175/66, 206, 207

[56] References Cited

U.S. PATENT DOCUMENTS

| | | | |
|---|---|---|---|
| 2,187,637 | 1/1940 | Sutton et al. | 204/129 |
| 2,300,283 | 10/1942 | Fisher | 204/184 |
| 2,376,535 | 5/1945 | Fisher | 204/184 |
| 3,244,279 | 4/1966 | Butler | 204/128 |
| 3,705,099 | 12/1972 | Hunter | 210/767 |

Primary Examiner—Howard S. Williams
Attorney, Agent, or Firm—McAulay, Fields, Fisher, Goldstein & Nissen

[57] ABSTRACT

A method for separating solid phase from drilling mud, comprising forming from drilling mud and adhesive layer on a rotary closed curvilinear surface partly placed in the drilling mud, with subsequent feeding of an ionized gas jet along a tangent line to the adhesive layer, the gas jet entraining and removing solid phase particles from the drilling mud. The linear velocity of the adhesive layer in the zone of its contact with the gas jet is controlled by changing the velocity of the gas jet. An apparatus for carrying out the method comprises: a tank filled with drilling mud and accommodating a drum installed for rotation for forming an adhesive layer of drilling mud on its cylindrical surface during rotation of the drum; a nozzle which is arranged in parallel to a tangent line to the drum surface and communicates with a source of a gas under pressure for forming a jet of gas that entrains and removes solid phase particles from the drilling mud; a pair of electrodes connected to a high-voltage d-c supply source for ionizing the gas jet.

7 Claims, 2 Drawing Figures

METHOD AND APPARATUS FOR SEPARATING SOLID PHASE FROM DRILLING MUD

FIELD OF THE INVENTION

The present invention relates to drilling techniques, and more particularly, to methods and apparatus for separating solid phase from drilling mud.

BACKGROUND OF THE INVENTION

It is known that drilling mud is a heterogeneous liquid system which necessarily contains colloidal solid phase particles. The presence of such particles in drilling mud determines a number of important rheological properties of drilling mud affecting the quality of well drilling. The drilling mud should retain these properties to ensure the best well drilling conditions. However, the stable maintenance of the properties of drilling mud during drilling is a very difficult problem.

The majority of drilling operations are conducted in clayey rocks. Drilled clayey rocks are partially dispersed and admix with the drilling mud in the form of very fine colloidal particles, and this surplus of solid phase should be continuously removed.

Inadequate separation of solid phase from drilling mud after several pumping cycles during well drilling substantially changes the composition of drilling mud, and various methods should be used for improving quality of drilling mud. Therefore, the economical separation of solid phase from drilling mud or, which is the same, the efficient cleaning of drilling mud from drillings is of a paramount importance for the well drilling process.

The technical and economical performance of drilling process depends to a large extent on the quality of the drilling mud used and the degree of its cleaning from drillings.

High-grade cleaning of drilling mud improves the mechanical speed of drilling and conditions for operation of drill bits and equipment. In addition to improving the mechanical speed of drilling, high-grade cleaning of drilling mud contributes to the reduction of consumption of materials used to preserve the adequate properties of drilling mud, prolong the life of the drilling mud and reduce complications and emergency situations during drilling.

A low quality of cleaning of drilling mud is the main reason of emergency situations and complications associated with drilling mud absorption, jamming of drilling and casing pipes, avalanches and fallouts of rock from the well walls.

Therefore, the high-grade cleaning of drilling mud from drillings is the most important production process during well drilling which has a substantial effect on the technical and economical performance of drilling.

All existing methods and apparatus for cleaning drilling mud enable the removal of only a certain portion of the solid phase from flowing (circulating) drilling mud. They all, however, possess a number of disadvantages inherent in the very concept of phase separation on which they are based. Thus, the smallest particle size for separation from drilling mud on vibratory screens depends on the mesh size of the screen. With a reduction of the mesh size to improve the quality of cleaning, the throughput capacity materially decreases and losses of drilling mud with the waste increase.

In cleaning in hydrocyclones, coarse and heavyweight solid phase particles are removed from drilling mud. Fine and light-weight particles (below 20 $\mu$m) appearing upon dispersion of drillings in drilling mud cannot be removed by using hydrocylones and other known cleaning apparatus.

Known in the art is a method for regenerating drilling mud, wherein drilling mud leaving the well and containing drillings is preliminarily diluted and separated from coarse solid phase particles. Fine non-charged drillings and colloidal negatively charged clayey particles are present in the diluted and cleaned drilling mud. Then negatively charged clayey particles are separated from the drilling mud by depositing them on a rotary anode with subsequent removal by means of a scraper. The deposited negatively charged clayey particles entrain therewith a quantity of non-charged particles which are also deposited on the rotary anode. This method only enables the cleaning of a portion of drilling mud, and the remaining portion is fed to the well without cleaning.

The cleaning of only a portion of drilling mud with precleaning to remove coarse particles with subsequent removal of fine particles is complicated and expensive.

DISCLOSURE OF THE INVENTION

With this object in view, this invention is a method for separating solid phase from drilling mud, wherein, an adhesive layer is formed from drilling mud on a rotary closed, curvilinear surface partially placed in the drilling mud, and an ionized gas jet is then fed along a tangent line to the adhesive layer to entrain and remove solid phase particles from drilling mud, the liner velocity of the adhesive layer in the zone of its contact with the gas jet being controlled by changing the velocity of the gas jet.

The gas jet is preferably ionized in a corona discharge electric field.

Ionization of the gas jet in the corona discharge electric field is most reliable since it enables a comparatively easy and efficient control of the intensity of the electric field.

The polarity of a corona discharge electric field is preferably changed depending on the mineralogical composition of the solid phase of drilling mud.

The change in polarity of the electric field results in a selective cleaning of drilling mud.

In an apparatus for separating solid phase from drilling mud, according to the present invention, there is provided a tank filled with drilling mud, in which is installed a drum so that an adhesive layer of the drilling mud being cleaned forms on its cylindrical surface during rotation, a nozzle which is mounted in parallel with a tangent line to the drum surface at a distance substantially equal to or greater than the thickness of the adhesive layer and communicates with a source of a gas under pressure for forming a gas jet entraining and removing solid particles from the drilling mud, and a pair of electrodes connected to a high-voltage d-c supply source for ionizing the gas jet.

The apparatus according to the invention is comparatively simple in structure and makes it possible to clean all drilling mud from solid phase particles and to control the content of the solid phase in drilling mud over a wide range.

Ionization of the gas jet efficiently diminishes the surface tension of the adhesive layer of drilling mud thus facilitating the separation of solid phase particles from the layer.

One electrode of the apparatus may be installed in the nozzle zone and comprises a comb for creating a corona discharge at the pointed teeth of the comb, and the other electrode may be installed on the drum side opposite to the nozzle in the direction of the gas jet flow and forms a screen for flying particles of the solid phase.

The relative arrangement of the electrodes, nozzle and drum according to the invention ensures the most efficient action of the centrifugal forces, the kinetic energy of the gas and the energy of the high-voltage electric field on the adhesive layer.

Therefore, the method and apparatus for separating solid phase from drilling mud ensure a selective cleaning of all drilling mud from solid phase particles and a control of the solid phase content in the drilling mud over a wide range. Considerable technical advantages of the method according to the present invention are achieved by simple techniques and economical operations. The apparatus for carrying out the method is comparatively simple and compact. The apparatus has a simple kinematic association and is reliable in operation. The use of the invention is more economical compared to the equipment employed at drilling sites for cleaning drilling mud.

BRIEF DESCRIPTION OF THE DRAWINGS

A specific embodiment of the invention will now be described with reference to the accompanying drawings, in which.

BEST MODE FOR CARRYING OUT THE INVENTION

Figures 1, 2:
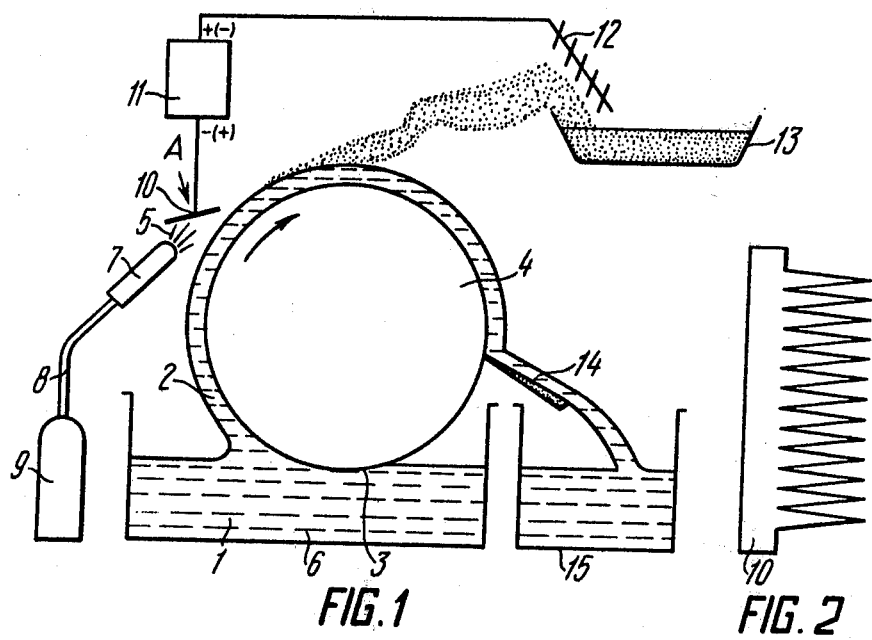
FIG. 1 schematically shows an apparatus for separating solid phase from drilling mud according to the present invention.
FIG. 2 is an enlarged view of an electrode taken along arrow A in FIG. 1.

A method for separating solid phase from drilling mud comprises forming from a drilling mud 1 (FIG. 1) an adhesive layer 2 on a rotary closed curvilinear surface 3, which is defined in this particular case by the cylindrical surface of a drum 4. The drum 4 is mounted in such a manner that a portion of its surface is in the drilling mud 1. An ionized gas jet 5 is then fed along a tangent line to the adhesive layer 2 to entrain solid phase particles of drilling mud and remove them therefrom. The linear velocity of the adhesive layer 2 in the zone of contact with the gas jet 5 is controlled by changing the velocity of the gas jet 5.

The linear velocity of the adhesive layer 2 increases with the kinetic energy of the gas jet 5. Hence, by varying the velocity of the jet 5 the linear velocity of the adhesive layer 2 can be controlled.

The gas jet 5 fed to the adhesive layer 2 is ionized beforehand in a corona discharge electric field.

The polarity of the corona discharge electric field is changed depending on the mineralogical composition of solid phase of the drilling mud 1 being cleaned.

The method will be disclosed in more detail in the description of construction and operation of an apparatus for carrying out the method.

An apparatus for separating solid phase from drilling mud comprises a tank 6 filled with the drilling mud 1 being cleaned. The drum 4 is mounted in the tank in such a manner that the cylindrical surface 3 of the drum is partly immersed in the drilling mud 1 filling the tank 6.

The drum 4 is coupled to a drive (not shown) for rotation, the drive having a speed governor. During rotation, an adhesive layer 2 forms on the surface of the drum 4. A nozzle 7 is provided outside the tank 6 and communicates by means of a pipe 8 with a source 9 of a gas under pressure for the forming the gas jet 5 which entrains solid phase particles and removes them from drilling mud. The nozzle 7 is arranged in such a manner that the gas jet 5 is fed in parallel to a tangent line to the surface of the drum 4 at a distance substantially equal to or slightly greater than the thickness of the adhesive layer 2.

An electrode 10 for ionizing the gas jet 5 is provided in the zone of the gas jet 5 and is connected to a d-c high-voltage supply source 11.

The electrode comprises a comb as shown in FIG. 2 so as to form a corona discharge on its pointed teeth. Another electrode 12 connected to the other terminal of the d-c source 11 is installed on the side of the drum opposite to the nozzle 7 in the direction of gas jet flow 5 and forms a screen for flying solid phase particles, to absorb their kinetic energy.

A container 13 for collecting wastes, that is removed solid phase particles, is provided under the electrode 12.

A scraper 14 is provided for removing the cleaned drilling mud 1 from the drum 4. The cleaned drilling mud is fed to a delivery tank 15.

The apparatus for separating solid phase from drilling mud functions in the following manner.

The adhesive layer 2 is formed from the drilling mud 1 being cleaned on the cylindrical surface 3 of the drum 4 rotating at a relatively high speed.

The adhesive layer 3 includes all fractions of solid phase which is present in the drilling mud 1. Under the action of centrifugal forces solid phase particles are re-distributed within the adhesive layer 2 in accordance with their volume density. Coarser and heavier solid phase particles tend toward the outer surface of the adhesive layer 2, whereas finer and especially colloidal particles concentrate at the inner surface of the adhesive layer 2.

For separating coarse particles from fine particles, the linear velocity of particles should be increased to a value at which the particle can overcome surface tension forces and may be separated from the adhesive layer 2.

Another way to facilitate the separation of particles from the adhesive layer 2 is to reduce the surface tension.

The centrifugal force is given by the relation:

$$F = (mV^2)/R \quad (1)$$

wherein
m is the mass of particle;
R is the radius of rotation of particle;
V is the linear velocity of particle,
acts on a solid phase particle in the adhesive layer.

The force of viscous friction and the surface tension force $F_1$ of the adhesive layer 2 is equal to $$F_1 = 2\pi r \sigma \quad (2)$$

wherein
$\sigma$ is the coefficient of surface tension of drilling mud
r is the radius of particle.

The Froude number showing how much centrifugal forces are greater than gravity in a given apparatus can be used for evaluating the forces participating in the distribution of solid phase particles in the surface layer and is given by the relation:

$$Fr = (\Omega^2 R)/g \qquad (3)$$

wherein $\Omega$ is the angular speed of the drum 4;
R is the radius of rotation of particle;
g is the acceleration of gravity.

The Froude number of actual structures of the invention ranges from 20 to 2000.

It follows from the above that in calculating the forces acting on solid particles in the adhesive layer 2 the gravity force may be neglected since the centrifugal forces are 20 to 2000 times greater.

Since the force of viscous friction of the solid phase particles with liquid that entrains them in rotation is directed along a tangent line to the surface of the drum 4 and at right angles to its radius, the radial displacement of particles, that is the main process in the separation of phases and fractions (cleaning) may be considered without taking into account the viscous friction forces.

Assuming that centrifugal forces F and surface tension forces $F_1$ tend to equalibrium, a condition for an equilibrium of particles in the adhesive layer 2 on the cylindrical surface 3 of the rotary drum 4 may be derived.

Therefore, the main parameters determining the process of separating solid phase from the drilling mud 1 on the rotating cylindrical surface 3 are the rotary speed of the drum 4, the surface tension of the adhesive layer 2 of drilling mud and the diameter of the drum 4.

It should be born in mind that an increase in the diameter of the drum 4 is restricted by structural and manufacturing limitations.

Generally equal quantities of positive and negative charges are present under normal conditions on a liquid surface; that is, such surfaces are electrically neutral and in such case they exhibit maximum mechanical strength. In case a charge of any polarity is created on the surface, this causes a reduction of its mechanical strength or, which is the same, a reduction of surface tension of liquid.

The studies showed that the most efficient reduction of surface tension of the adhesive layer of the drilling mud 1 is achieved when it is treated by an ionized gas, the gas jet 5 being fed along a tangent line to the adhesive layer 2 of the drilling mud 1. The ionized gas jet 5 imparts an additional acceleration to the adhesive layer 2, and its linear velocity increases. By controlling the amount of gas, a synchronous rotation of all strata of the adhesive layer 2 may be achieved.

In such a case optimum conditions are provided for interaction of centrifugal and surface tension forces so that the centrifugal forces can be increased, which, in turn, makes it possible to separate from the drilling mud still finer solid phase particles at constant molecular cohesion forces (surface tension).

Thus, feeding the jet 5 of an ionized gas along a tangent line to the adhesive layer 2 of the rotary drum 4 contributes to a reduction of the surface tension, hence, makes it possible to reduce average size of particles separated from the drilling mud.

It has been also found that the change in polarity of the electrode 10 in the electric field in which the gas is ionized, has a substantial effect on the process of separation of solid phase from the drilling mud 1. During rotation of the drum 4 the adhesive layer 2 forms on its surface 3, the thickness of the layer depending on the dynamic viscosity of the drilling mud 1. The adhesive layer 2 contains solid drillings (particles of the rock), weighing agent, and surplus clayey phase. During rotation of the drum 4 solid phase of the drilling mud 1 tends under the action of centrifugal forces toward the surface of the adhesive layer 2 and, depending on the particle size, specific density, linear velocity and surface tension of the adhesive layer 2, the solid phase particles are separated from the layer surface.

Depending on the rheological properties of the drilling mud 1 (structural viscosity, dynamic shear stresses and the like), the velocity of the adhesive layer 2 is lower than the velocity of rotation of the surface 3 of the drum 4.

To compensate for this phenomenon, the gas jet 5, which is concurrently treated in the corona discharge electric field of the electrode 10, is fed along a tangent line to the adhesive layer 2 from the nozzle 7. By controlling the amount of gas fed, a synchronous rotation of all strata of the adhesive layer 2 of the drilling mud 1 and the drum surface 3 is achieved. This provides the best conditions for the centrifugal separation of particles within the adhesive layer 2. As the gas being fed is ionized, two additional actions are provided: the surface tension of the adhesive layer 2 is lowered, and an inflow of charged particles from the inner zones of the adhesive layer 2 is ensured toward the outer surface thereof, the polarity of the charged particles being opposite to that of the electrode 10 ionizing the gas fed to the adhesive layer 2. The reduction of the surface tension of the adhesive layer 2 of the drilling mud 1 facilitates to a greater extent the separation of solid phase from the drilling mud 1, and by changing the polarity of gas ions a selective cleaning of the adhesive layer 2 of the drilling mud 1 is achieved.

When a positive charge is applied to the electrode 10 from the high-voltage d-c supply source, the gas is positively ionized and causes the inflow of negatively charged particles which are separated from the drilling mud 1; these particles give up their charges in the flow of the ionized gas, they are positively charged and attracted by the negatively charged electrode 12 where they are neutralized and fall down under gravity into the container 13 for collecting wastes.

A change in polarity and application to the electrode 10 of negative charge from the high-voltage d-c supply source and feeding negative gas ions to the adhesive layer 2 of the drilling mud 1 causes the movement of negatively charged particles within the adhesive layer 2 to its inner surface. Therefore, with the negatively charged electrode 10, heavy-weight neutral particles (barite, hematite) and particles of the rock which are positively charged are separated from the adhesive layer 2, that is the separation is effected in accordance with the mineralogical composition of the solid phase.

To remove the weighing agent from the drilling mud 1 by way of its centrifugal separation, solid drillings are dispersed before separation to the weighing agent particle size. In such a case the weighing agent particles having a specific gravity of 4.2 g/cm³ are separated from the drillings having almost twice lower specific gravity.

Therefore, feeding of ionized gas jet 5 to the adhesive layer 2 of the drilling mud 1 makes it possible to control the separation of solid phase over a wide range.

The adhesive layer 2 cleaned from solid phase under the action of the ionized gas jet 5 is cut-off by the scraper 14 during rotation and is fed to the tank 15.

By changing the rotary speed of the drum 4, the amount of gas fed to the adhesive layer 2 and polarity of voltage applied to the electrodes 10 and 12, a selective cleaning of the drilling mud 1 is achieved.

Therefore, the method for cleaning drilling mud according to the invention makes it possible to effect a selective cleaning of all drilling mud from solid phase particles over a wide range which is impossible with any known method or apparatus.

Economical effectiveness of the invention is achieved by reducing the cost of cleaning of drilling mud, improving the quality of cleaning, hence, increasing the mechanical speed of drilling.

INDUSTRIAL APPLICABILITY

The invention may be most advantageously used in drilling oil and gas production wells and geological prospecting boreholes.

The invention may also be used in the chemical industry, in the manufacture of building materials and in other industries where a solid phase is to be separated from slurries.

We claim:

1. A method for separating solid phase particles from drilling mud, comprising:
    forming an adhesive layer of used mud on a rotary closed drum between spaced electrodes, feeding an ionized, pressurized gas jet along a tangent to said adhesive layer at right angles to the radius of said drum to decrease the surface tension of said layer and to entrain said particles and remove them from the mud;
    changing the rotary speed of said drum, the amount of said gas fed to said adhesive layer and the polarity of voltage applied to said electrodes to selectively clean said mud; and
    physically removing the cleaned adhesive layer from said drum.

2. The method of claim 1, comprising:
    ionizing said gas jet in a corona discharge electric field prior to feeding same to said adhesive layer.

3. The method of claim 2, comprising:
    changing the polarity of said corona discharge electric field in accordance with the mineralogical composition of said solid phase.

4. The method of claim 3, wherein said drum is rotated at a speed such as to provide a Froud number of 20 to 2000.

5. The method of claim 2, wherein said drum is rotated at a speed such as to provide a Froud number 20 to 2000.

6. The method of claim 1, wherein said drum is rotated at a speed such as to provide a Froud number of 20 to 2000.

7. Apparatus for separating solid phase particles from drilling mud, comprising; in combination:
    a tank containing used mud;
    a driven rotatable drum partly immersed in said drum for forming an adhesive layer on the surface of said drum;
    a nozzle parallel with a tangent line to said surface of said drum at a distance substantially equal to or greater than the thickness of said adhesive layer and communicating with a source of pressurized gas;
    a first electrode connected to a high voltage d-c source between said drum and said nozzle for ionizing said gas jet prior to contacting said adhesive layer;
    said electrode comprising a comb having pointed teeth for creating a corona discharge at said teeth;
    a second electrode connected to said d-c source installed on the side of said drum opposite said nozzle in the direction of the gas jet flow;
    said second electrode forming a screen for solid phase particles flying off said drum;
    a receptacle below said second electrode for collecting said particles; and
    scraping means cooperating with said drum installed past said receptacle for removing cleaned drilling mud from said drum.

* * * * *